(12) United States Patent
Meyrick et al.

(10) Patent No.: US 6,235,096 B1
(45) Date of Patent: *May 22, 2001

(54) AQUEOUS INK COMPOSITIONS

(75) Inventors: Barry Huston Meyrick, Manchester; Mark Holbrook, Bury; Roy Bradbury, St Helens, all of (GB)

(73) Assignee: Zeneca Limited, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/269,561

(22) PCT Filed: Sep. 19, 1997

(86) PCT No.: PCT/GB97/02557

§ 371 Date: Mar. 30, 1999

§ 102(e) Date: Mar. 30, 1999

(87) PCT Pub. No.: WO98/14525

PCT Pub. Date: Apr. 9, 1998

(30) Foreign Application Priority Data

Oct. 1, 1996 (GB) ................................................. 9620445
May 7, 1997 (GB) ................................................. 9809128

(51) Int. Cl.$^7$ ................................................. C09D 11/02
(52) U.S. Cl. ..................... 106/31.43; 106/31.48; 106/31.5; 106/31.51; 106/31.46; 106/31.47; 106/31.49
(58) Field of Search .............. 106/31.43, 31.51, 106/31.48, 31.5, 31.46, 31.47, 31.49

(56) References Cited

U.S. PATENT DOCUMENTS

| | | | |
|---|---|---|---|
| 4,065,447 | * 12/1977 | Jotterand ................ | 534/794 |
| 4,148,770 | 4/1979 | Stahle et al. ............ | 428/260 |
| 4,271,071 | * 6/1981 | Clark .................... | 534/794 |
| 4,388,115 | 6/1983 | Sugiyama et al. ......... | 106/315 |
| 4,650,861 | * 3/1987 | Weaver et al. ........... | 534/794 |
| 4,680,332 | 7/1987 | Hair et al. .............. | 524/377 |
| 4,804,719 | 2/1989 | Weaver et al. ........... | 525/420 |
| 4,929,277 | * 5/1990 | Tanaka et al. ........... | 106/31.5 |
| 5,006,598 | 4/1991 | Adams et al. ............ | 524/601 |
| 5,028,262 | 7/1991 | Barlow, Jr. et al. ...... | 106/31.27 |
| 5,132,275 | 7/1992 | Chapman et al. .......... | 503/227 |
| 5,226,957 | 7/1993 | Wickramanayake ......... | 106/31.25 |
| 5,336,714 | 8/1994 | Krutak et al. ........... | 524/608 |
| 5,342,440 | 8/1994 | Wickramanayake ......... | 106/31.25 |
| 5,446,136 | * 8/1995 | Pape et al. .............. | 534/794 |
| 5,502,172 | * 3/1996 | Pape et al. .............. | 534/794 |
| 5,518,983 | 5/1996 | Bradbury et al. ......... | 503/227 |
| 5,531,816 | 7/1996 | Wickramanayake ......... | 106/31.6 |
| 5,565,022 | 10/1996 | Wickramanayake ......... | 106/31.27 |
| 5,614,008 | 3/1997 | Escano et al. ........... | 106/31.15 |
| 5,665,151 | 9/1997 | Escano et al. ........... | 106/31.15 |
| 5,837,754 | 11/1998 | Shimomura et al. ........ | 523/161 |

FOREIGN PATENT DOCUMENTS

| | | |
|---|---|---|
| 0351328 | 1/1990 | (EP). |
| 0763577 | 3/1997 | (EP). |
| 2297231 | 8/1976 | (FR). |
| 2311820 | 12/1976 | (FR). |
| 2161495 | 1/1986 | (GB). |
| 7196965 | 8/1995 | (JP). |
| 9106608 | 5/1991 | (WO). |
| 9409073 | 4/1994 | (WO). |
| 9528286 | 10/1995 | (WO). |
| 9534024 | 12/1995 | (WO). |
| 9603467 | 2/1996 | (WO). |
| 9706217 | 2/1997 | (WO). |

* cited by examiner

Primary Examiner—Helene Klemanski
(74) Attorney, Agent, or Firm—Rothwell, Figg, Ernst & Manbeck

(57) ABSTRACT

1. An ink comprising water, a water-dissipatable polymer and a dye, wherein the dye carries a group of the Formula (1):

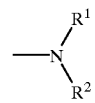

(1)

wherein:

$R^1$ is optionally substituted branched chain alkyl; and $R^2$ is H, optionally substituted alkyl or optionally substituted aryl.

The inks are useful in ink jet printers.

19 Claims, No Drawings

AQUEOUS INK COMPOSITIONS

This invention relates to inks and to their use in ink jet printing.

Ink jet printing methods involve printing an image onto a substrate using ink droplets emitted from a small nozzle without bringing the nozzle into contact with the substrate. Over recent years ink jet printers have become popular because they are quieter and more versatile than impact printers, for example conventional basket typewriters are noisy and the images they can print are restricted to the shapes moulded onto the end of each mechanical lever. The most popular ink jet printers are the thermal and piezoelectric.

The requirements for inks used in ink jet printers include:
i) they should not clog the small nozzle from which they are emitted, or form a blocking crust over the end,
ii) the resultant image should have good water-fastness so that it does not smudge excessively on contact with sweat or water,
iii) the image should also have a good light-fastness so that it does not fade quickly on exposure to daylight,
iv) they should dry quickly on paper and give discrete, sharp images,
v) they should have good storage stability, and
vi) they should have a high colour strength to give intensely coloured images.

We have now found that very good ink jet printing inks may be prepared having the compositions defined below.

According to the present invention there is provided an ink comprising water, a water-dissipatable polymer and a dye, wherein the dye carries a group of the Formula (1):

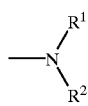

(1)

wherein:
$R^1$ is optionally substituted branched chain alkyl; and
$R^2$ is H, optionally substituted alkyl or optionally substituted aryl.

Preferably $R^1$ is α-branched optionally substituted alkyl, more preferably a group of the formula —$CHR^3R^4$ wherein $R^3$ and $R^4$ are each independently optionally substituted alkyl or $R^3$ and $R^4$ together with the CH group to which they are attached from an optionally substituted 5- or 6- membered ring. Preferably $R^1$ has from 3 to 20 carbon atoms, more preferably 3 to 10 carbon atoms. Examples of preferred groups represented by $R^1$ include prop-2-yl, but-2-yl, pent-2-yl, pent-3-yl, hex-2-yl, hex-3-yl, hept-2-yl, cyclopentyl and cyclohexyl.

When the group —$CHR^3R^4$ forms a 5- or 6-membered ring the ring is preferably a cyclohexyl or cyclopentyl ring.

$R^2$ is preferably optionally substituted aryl, more preferably optionally substituted alkyl.

When $R^2$ is optionally substituted aryl it is preferably an optionally substituted phenyl.

When $R^2$ is an optionally substituted alkyl group it can be straight chain or branched chain. Preferably $R^2$ is $C_{1-20}$-alkyl, more preferably $C_{1-10}$-alkyl, especially $C_{1-6}$-alkyl, more especially $C_2$–$C_6$-alkyl, each of which is optionally substituted.

The optional substituents which may be present on $R^1$, $R^2$, $R^3$ and $R^4$ are preferably selected from $C_{1-4}$-alkoxy, especially methoxy; halo, especially Cl, Br or F; $C_{1-4}$-alkyl, especially methyl; nitro; cyano; optionally substituted amino, especially —$NR^aR^b$ wherein $R^a$ and $R^b$ are each independently H, $C_{1-4}$-alkyl or $C_{1-4}$-alkyl substituted by hydroxy, carboxy or sulpho; or an ester group, especially —$OCOR^a$ or —$CO_2R^a$ wherein $R^a$ is as hereinbefore defined.

In a preferred embodiment the group of Formula (1) is attached to a phenyl group in the dye, more preferably to a phenyl group carrying an azo, imine or alkylene substituent, especially such a substituent at the 4-position relative to the group of Formula (1).

In preferred ink the group of Formula (1) is attached to a phenyl group carrying an azo substituent at the 4-postion, more preferably the dye is of the Formula:

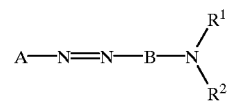

wherein:

A is the residue of a diazotisable aromatic or heterocyclic amine;

B is an optionally substituted 1,4-phenylene group; and $R^1$ and $R^2$ are as hereinbefore defined.

A is preferably phenyl, naphthyl, thaizolyl, isothiazolyl, benzothiazolyl, benzoisothiazolyl, pyrazolyl, thiadiazolyl, triazolyl, imidazolyl, thienyl, pyridyl or pyridoisothiazolyl, each of which is optionally substituted.

When A is phenyl it is preferably of the Formula (2):

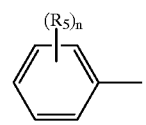

Formula (2)

wherein:

$R^5$ is —H, optionally substituted alkyl, optionally substituted alkoxy, —$NO_2$, —CN, —CHO, alkenyl, —$CF_3$, —SCN, halogen, acyl, ester, amide, thioalkyl or thioaryl, —$SO_2NH_2$, —$SO_2F$, —$SO_2Cl$, —$CONH_2$, —COF or —COCl; and n is an integer from 1 to 5.

When $R^5$ is acyl it is preferably —CO($C_{1-4}$-alkyl), —SO($C_{1-4}$-alkyl) or —$SO_2$($C_{1-4}$-alkyl); when $R^5$ is an ester it is preferably —OCO($C_{1-4}$-alkyl), —COO($C_{1-4}$-alkyl) or —$SO_3$ ($C_{1-4}$-alkyl); when $R^5$ is amide it is preferably a carbonamido or sulphonamido group, more preferably—CONH($C_4$-alkyl), —NHCO($C_{1-3}$-alkyl), —CON($C_{1-4}$-alkyl)$_2$, —$SO_2NH$($C_{1-4}$-alkyl), —$NHSO_2$($C_{1-4}$-alkyl) or —$SO_2N$ ($C_{1-4}$-alkyl)$_2$; when $R^5$ is thioalkyl or thioaryl it is preferably —S($C_{1-4}$-alkyl) or —S(phenyl).

When A is naphthyl it is preferably of the Formula (3):

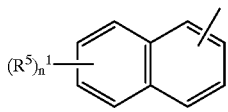

Formula (3)

wherein:

$R^5$ is as hereinbefore defined; and $n^1$ is an integer from 1 to 4.

When A is thiazolyl it is preferably of the Formula (4):

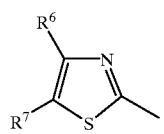

Formula (4)

wherein:

$R^6$ is —H, optionally substituted alkyl, optionally substituted alkoxy, optionally substituted aryl, halogen or —Salkyl; and $R^7$ is —H, optionally substituted alkyl, alkenyl, —CN, —NO$_2$, —SO$_2$alkyl, —COOalkyl, halogen or —CHO.

When A is isothiazolyl it is preferably of the Formula (5):

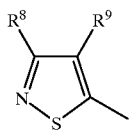

Formula (5)

wherein:

$R^8$ is —H, optionally substituted alkyl, optionally substituted aryl, optionally substituted pyridyl, —SO$_2$alkyl, —Salkyl, —Saryl or halogen; and $R^9$ is —H, —CN, —NO$_2$, —SCN or —COOalkyl.

When A is benzothiazolyl it is preferably of the Formula (6):

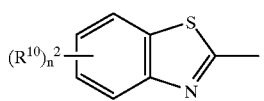

Formula (6)

wherein:

$R^{10}$ is —H, —SCN, —NO$_2$, —CN, halogen, optionally substituted alkyl, optionally substituted alkoxy, —COOalkyl, —OCOalkyl or —SO$_2$alkyl; and $n^2$ is from 1 to 4.

When A is benzoisothiazolyl it is preferably of the Formula (7):

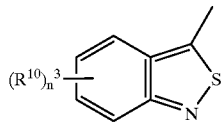

Formula (7)

wherein:

$R^{10}$ as hereinbefore defined; and $n^3$ is from 1 to 4.

When A is pyrazolyl it is preferably of the Formula (8):

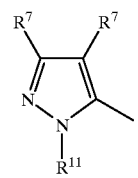

Formula (8)

wherein:

each $R^7$ independently is as hereinbefore defined; and $R^{11}$ is —H, optionally substituted alkyl or optionally substituted aryl, When A is thiadiazolyl or triazolyl it is preferably of Formula (9) or (10):

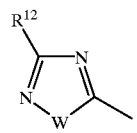

Formula (9)

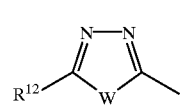

Formula (10)

wherein:

$R^{12}$ is —Salkyl, —Saryl, —SO$_2$alkyl, halogen or optionally substituted $C_{1-4}$-alkyl; and W is S or N.

When A is imidazolyl it is preferably of the Formula (11):

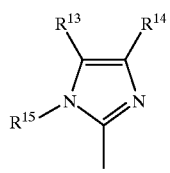

Formula (11)

wherein:

$R^{13}$ is —CN, —CHO, —CH=C(CN)$_2$ or —CH=C(CN)(COOalkyl);

$R^{14}$ is —CN or —Cl; and $R^{15}$ is —H or optionally substituted alkyl.

When A is thienyl it is preferably of the Formula (12):

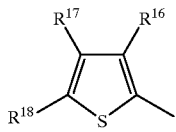

Formula (12)

wherein:
$R^{16}$ is —$NO_2$, —CN, alkylcarbonylamino or alkoxycarbonyl;
$R^{17}$ is —H, halogen, optionally substituted alkyl, optionally substituted alkoxy, optionally substituted aryl or —Salkyl; and
$R^{18}$ is —H, optionally substituted alkyl, —CN, —$NO_2$, —$SO_2$alkyl, —COOalkyl, halogen, —CH=C(CN)$_2$ or —CH=C(CN)(COOalkyl).

When A is pyridyl it is preferably of the Formula (13):

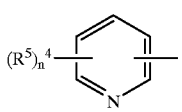

Formula (13)

wherein:
$R^5$ is as hereinbefore; and
$n^4$ is from 1 to 4.

When A is pyridoisothaizolyl it is preferably of the Formula (14):

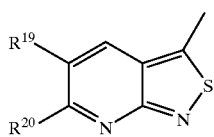

Formula (14)

wherein:
$R^{19}$ is —CN or —$NO_2$; and
$R^{20}$ is optionally substituted alkyl.

When any of $R^2$ to $R^{20}$ is optionally substituted alkyl, optionally substituted alkoxy or optionally substituted aryl the optional substituents are preferably selected from —CN, —SCN, —$NO_2$, halogen, especially —F, —Cl and —Br, —$SC_{1-4}$-alkyl, —Sphenyl, $C_{1-4}$-alkoxy and —$COOC_{1-4}$-alkyl.

When any of $R^3$ to $R^{20}$ is or contains an alkyl or alkoxy group it is preferably $C_{1-6}$-alkyl or $C_{1-6}$-alkoxy, more preferably $C_{1-4}$-alkyl, or $C_{1-4}$-alkoxy.

The halogen group represented by $R^5$, $R^6$, $R^7$, $R^8$, $R^{10}$, $R^{12}$ or $R^{18}$ is preferably —F, —Cl or —Br.

Especially preferred groups represented by $R^5$ are selected from —$NO_2$, —CN, —$COOC_{1-4}$-alkyl and $C_{1-4}$-alkyl.

In phenyl groups of Formula (2) n is preferably from 1 to 3, more preferably 1 or 2. When the phenyl group of Formula (2) carries 3 substituents these are preferably in the 2-, 4- and 6-positions. When the phenyl group of Formula (3) carries 1 or 2 substituents these are preferably in the 2- or 4- or in both the 2- and 4- positions, more preferably in the 4-position with respect to the —N=N— linkage.

The optionally substituted aryl group represented by $R^6$, $R^8$, $R^{11}$ or $R^{17}$ is preferably phenyl or substituted phenyl.

$R^6$ is preferably —H, optionally substituted $C_{1-4}$-alkyl, optionally substituted $C_{1-4}$-alkoxy, optionally substituted phenyl, —F, —Cl, —Br or —$SC_{1-4}$-alkyl, more preferably —H, $C_{1-4}$-alkyl, $C_{1-4}$-alkoxy, phenyl or —$SC_{1-4}$-alkyl and especially —H, —$CH_3$ or $C_2H_5$.

$R^7$ is preferably —H, optionally substituted $C_{1-4}$-alkyl, —CN, —$NO_2$, —$SO_2C_{1-4}$-alkyl, —$COOC_{1-4}$-alkyl, —Cl, —F, Br or —CHO, $C_{2-6}$-alkenyl, more preferably —H, $C_{1-4}$-alkyl, cyano-$C_{1-4}$-alkyl, —CN, —$NO_2$, —CHO, $C_{2-3}$-alkenyl and especially —$NO_2$, —CN, —CHO, vinyl or —$CH_2CN$.

$R^8$ is preferably —H, optionally substituted $C_{1-4}$-alkyl, optionally substituted phenyl, —$SO_2C_{1-4}$-alkyl, —$SC_{1-4}$-alkyl, —Sphenyl, —Cl, —F or —Br, more preferably $C_{1-4}$-alkyl, phenyl or —$SO_2C_{1-4}$-alkyl, and especially —$CH_3$ or —$CO_2CH_3$.

$R^9$ is preferably —CN, —$NO_2$, —SCN or —$COOC_{1-4}$-alkyl, more preferably —CN or —$NO_2$.

In benzothiazolyl groups of Formula (6) $n^2$ is preferably 1 or 2, more preferably 1. The substituent represented by $R^{10}$ is preferably in the 6-position.

$R^{10}$ is preferably —H, —SCN, —$NO_2$, —Cl, —F, Br, optionally substituted $C_{1-4}$-alkyl, optionally substituted $C_{1-4}$-alkoxy, —$COOC_{1-4}$-alkyl, —$OCOC_{1-4}$-alkyl or —$SO_2C_{1-4}$-alkyl, more preferably —H, —SCN, —$NO_2$, $C_{1-4}$-alkoxy or —$SO_2C_{1-4}$-alkyl and especially —SCN or —$SO_2CH_3$.

In benzoisothiazolyl groups of Formula (7) $n^3$ is preferably 1 or 2, more preferably 1.

$R^{11}$ is preferably —H, optionally substituted $C_{1-4}$-alkyl or optionally substituted phenyl, more preferably cyano-$C_{1-4}$-alkyl and, especially cyanomethyl.

$R^{12}$ is preferably —$SC_{1-4}$-alkyl, —Sphenyl or —$SO_2C_{1-4}$-alkyl, more preferably —$SC_{1-4}$-alkyl and —$SO_2C_{1-4}$-alkyl, especially —$SCH_3$ or —$SC_2H_5$.

$R^{13}$ is preferably —CN, —CHO, —CH=C(CN)$_2$ or —CH=C(CN)$COOC_{1-4}$-alkyl and more preferably —CN.

$R^{14}$ is preferably —CN.

$R^{15}$ is preferably cyano-$C_{1-4}$-alkyl, especially cyanomethyl.

$R^{16}$ is preferably —$NO_2$, —CN, $C_{1-4}$-alkylcarbonylamino or $C_{1-4}$-alkoxycarbonyl more preferably —$NO_2$, —CN, ethoxycarbonyl or methylaminocarbonyl.

$R^{17}$ is preferably —H, halogen, optionally substituted $C_{1-4}$-alkyl, optionally substituted $C_{1-4}$-alkoxy, optionally substituted phenyl —$SC_{1-4}$-alkyl, more preferably $C_{1-4}$-alkoxy, —Cl, —Br, phenyl, —$SC_{1-4}$-alkyl and especially —H, —Cl or methyl.

$R^{18}$ is preferably —H, $C_{1-4}$-alkyl, —CN, —$NO_2$, —$SO_2C_{1-4}$-alkyl, —$COOC_{1-4}$-alkyl, —Cl, —F, —Br, —CH=C(CN)$_2$ or —CH=C(CN)(COO$C_{1-4}$-alkyl) and more preferably —$NO_2$, —CN, —CH=C(CN)$_2$ or —CH=C(CN)(COO$C_{1-4}$-alkyl).

In pyridyl groups of Formula (13) $n^4$ is preferably from 1 to 3, more preferably 1 or 2 and especially 1.

When B is substituted it is preferred that the substituent(s) are in one or more of the 2-,3-,5- and 6-positions, more preferably in one or more of the 2- and 3-positions, especially in the 3-position with respect to the -$NR^1R^2$ group.

In a preferred sub-group of inks the group A is phenyl, isothiazol-5-yl, benzoisothiazol-3-yl, 1,2,4-thiadiazol-5-yl, 1,3,4-thiadiazol-5-yl or pyrazol-5-yl; B is 1,4-phenylene which is unsubstituted or carries a 3-methyl or a 3-acetylamino substituent; $R^1$ is an α-branched optionally substituted $C_{3-10}$-alkyl group; and $R^2$ is $C_{1-10}$-alkyl.

In a further preferred sub-group of inks A is phenyl, thiazol-2-yl, isothiazol-5-yl, 1,3,4-thiadiazol-5-yl or thien- 2-yl; B is 1,4-phenylene which is unsubstituted or carries a 3-methyl or a 3-acetylamino substituent; $R^1$ is an α-branched optionally substituted $C_{3-10}$-alkyl group; and $R^2$ is $C_{1-10}$-alkyl.

In a further preferred sub-group of inks $R^1$ is sec-butyl, isopropyl or α-methylbenzyl; $R^2$ is ethyl, n-butyl, 2-phenoxyethyl, 2-acetoxyethyl or sec-butyl; B is 1,4-phenylene which is unsubstituted or carries a 3-methyl or a 3-acetylamino substituent; and A is 3-methyl-4-cyanoisothiazol-5-yl, benzoisothiazol-3-yl, 1,2,4-thiadiazol-5-yl or 1,3,4-thiadiazol-5-yl or pyrazol-5-yl.

In a further preferred sub-group of inks $R^1$ is sec-butyl, isopropyl or α-methylbenzyl; $R^2$ is ethyl, n-butyl, 2-acetoxyethyl or sec-butyl; B is 1,4-phenylene which is unsubstituted or carries a 3-methyl or 3-acetylamino substituent; and A is 3-methyl-4-cyanoisothiazol-5-yl.

In a further preferred sub-group of inks $R^1$ is sec-butyl, isopropyl or α-methylbenzyl; $R^2$ is ethyl, n-butyl, 2-phenoxyethyl, 2-acetoxyethyl or sec-butyl; B is 1,4-phenylene which carries a 3-methyl or 3-acetylamino substituent; and A is 3-methyl-4-cyanoisothiazol-5-yl.

In a further preferred sub-group of inks $R^1$ is sec-butyl, or α-methylbenzyl; $R^2$ is ethyl, n-butyl, 2-phenoxyethyl, 2-acetoxyethyl or sec-butyl; B is 1,4-phenylene which carries a 3-acetylamino substituent; and A is 4-cyano-3-methylisothiazol-5-yl.

As mentioned above, in a preferred class of inks the dye carries a group of Formula (1) attached to a 1,4-phenylene group carrying an imine or alkylene substituent at the 4-position. In inks of this class the dye is preferably of the formula:

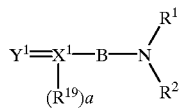

wherein:
$X^1$ is N or C;
a is 0 when $X^1$ is N;
a is 1 when $X^1$ is C;
$R^{19}$ is —H, —CN or —COOalkyl;
$R^1$, $R^2$ and B are as hereinbefore defined; and
$Y^1$ is a homocyclic ring, a heterocyclic ring, a carbon atom carrying an electron withdrawing group or $Y^1$ together with $X^1$ and $(R^{19})a$ forms a homocyclic or heterocyclic ring.
$R^{19}$ is preferably —H, —CN or —CO$_2$($C_{1-4}$-alkyl), more preferably —H or —CN, especially —CN.
When $Y^1$ is a homocyclic ring it is preferably of the Formula (15):

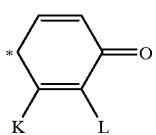

(15)

wherein:
K and L are each independently H, alkyl, amido or halo; or
K and L together with the carbon atom to which they are attached form a 5- or 6- membered ring, preferably a 5- or 6- membered heterocyclic or carbocyclic ring.

When K or L is alkyl it is preferably $C_{1-4}$-alkyl. When K or L is amido it is preferably —NHCOC$_{1-4}$-alkyl, —CONHC$_{1-4}$-alkyl, —NHCOaryl or —CONHaryl; the aryl group is preferably phenyl. When K or L is halo it is preferably F, Cl or Br.

When $Y^1$ together with $X^1$ and $(R^{19})$ a forms a heterocyclic ring they preferably form a ring of the formula:

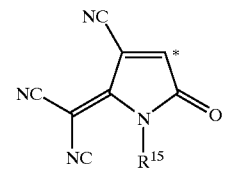

wherein $R^{15}$ is as hereinbefore defined.
When $Y_1$ is a heterocyclic ring it is preferably of the Formula (16), (17) or (18):

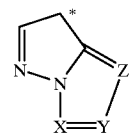

(16)

(17)

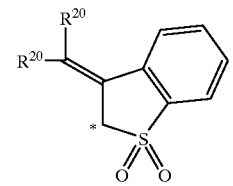

(18)

wherein:
Ph is phenyl;
X, Y and Z are each independently N or C—$R^{21}$; each $R^{20}$ independently is an electron withdrawing group; and
$R^{21}$ is H, CN, alkyl, alkoxy, cycloalkyl, aryl, aralkyl, aryloxy or amino.
When $Y^1$ is a carbon atom carrying an electron withdrawing group it is preferably of the Formula (19):

(19)

wherein:
$R^{20}$ is as hereinbefore defined; and
$R^{21}$ is H, $C_{1-4}$-alkyl or an electron withdrawing group.
$R^{20}$ is preferably —CN, —NO$_2$, —CO($C_{1-4}$-alkyl) or —COO($C_{1-4}$-alkyl).
$R^{21}$ is preferably H, —CN, —$C_{1-4}$-alkyl, phenyl or a group of Formula (20):

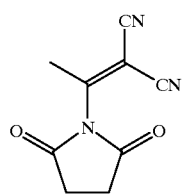
(20)

In Formulae (15) to (19) the carbon atom marked with an asterisk (*) is the point of attachment to the double bond which is itself attached to $X^1$.

Dyes carrying a group of Formula (1) may be prepared in an analogous manner to known dyes, except that an intermediate is chosen which carries a group of Formula (1). For example, the first class of dye represented by the formula A—N=N—B—$NR^1R^2$ may be prepared by diazotising an amine of formula A—$NH_2$, preferably below 5° C. in dilute mineral acid using $NaNO_2$, and coupling to a compound of formula H—B—$NR^1R^2$, wherein A, B, $R^1$ and $R^2$ are as hereinbefore defined. Numerous texts describe general methods for synthesising dyes, including Organic Chemistry in Colour, P. F. Gordon and P. Gregory, (ISBN 3-540-17260-2), chapter 2.4 entitled 'Synthesis of Dyes' and The Chemistry of Synthetic Dyes, Volumes I to VII, K. Venkataraman, and The Chemistry and Application of Dyes, G. Hallas and D. R. Waring ISBN 0-306-43278-1.

The water-dissipatable polymer preferably bears ionised carboxy and/or sulphonate groups, especially ionised sulphonate groups, because these assist water dissipatability of the polymer. Such groups can be chain pendant and/or terminal.

The water-dissipatable polymer is preferably a water-dissipatable polyester. The water-dissipatable polyester can be prepared using conventional polymerisation procedures known to be effective for polyester synthesis. Thus, it is well known that polyesters contain carbonyloxy (i.e —C(=O)—O—) linking groups and may be prepared by a condensation polymerisation process in which an acid component (including ester-forming derivatives thereof) is reacted with a hydroxyl component. The acid component may be selected from one or more polybasic carboxylic acids, e.g. di- and tri-carboxylic acids or ester-forming derivatives thereof, for example acid halides, anhydrides or esters. The hydroxyl component may be one or more polyhydric alcohols or phenols (polyols), for example, diols, triols, etc. (It is to be understood, however, that the polyester may contain, if desired, a proportion of carbonylamino linking groups —C(=O)—NH— (i.e. amide linking groups) by including an appropriate amino functional reactant as part of the "hydroxyl component"; such as amide linkages). The reaction to form a polyester may be conducted in one or more stages. It is also possible to introduce in-chain unsaturation into the polyester by, for example, employing as part of the acid component an olefinically unsaturated dicarboxylic acid or anhydride.

Polyesters bearing ionised sulphonate groups may be prepared by using at least one monomer having two or more functional groups which will readily undergo an ester condensation reaction (e.g carboxyl groups, hydroxyl groups or esterifiable derivatives thereof) and one or more sulphonic acid groups (for subsequent neutralisation after polyester formation) or ionised sulphonate groups (i.e. neutralisation of the sulphonic acid groups already having been effected in the monomer) in the synthesis of the polyester. In some cases it is not necessary to neutralise sulphonic acid groups since they may be sufficiently strong acid groups as to be considerably ionised in water even without the addition of base. Often, the sulphonic acid or ionised sulphonate containing monomer is a dicarboxylic acid monomer having at least one ionised sulphonate substituent (thereby avoiding any need to effect neutralisation subsequent to polyester formation). (Alternatively, alkyl carboxylic acid ester groups may be used in place of the carboxylic acid groups as ester-forming groups). Such a monomer will therefore be part of the acid component used in the polyester synthesis.

Preferred polybasic carboxylic acids which can be used to form the polyester have two or three carboxylic acid groups. For example, one can use $C_4$ to $C_{20}$ aliphatic, alicyclic and aromatic compounds having two or more carboxy groups and their ester forming derivatives (e.g. esters, anhydrides and acid chlorides), and dimer acids such as C36 dimer acids. Specific examples include adipic acid, fumaric acid, maleic acid, succinic acid, itaconic acid, sebacic acid, nonanedioic acid, decanedioic acid, 1,4-cyclohexanedicarboxylic acid, 1,3-cyclohexanedicarboxylic acid, 1,2-cyclohexanedicarboxylic acid, terephthalic acid, isophthalic acid, phthalic acid and tetrahydrophthalic acid and their acid chlorides. Anhydrides include succinic, maleic, phthalic and hexahydrophthalic anhydrides.

Preferred polyols which can be used to form the polyester include those having from 2 to 6, more preferably 2 to 4 and especially 2 hydroxyl groups per molecule. Suitable polyols having two hydroxy groups per molecule include diols such as 1,2-ethanediol, 1,3-propanediol, 1,4-butanediol, 1,6-hexanediol, 2,2-dimethyl-1,3- propanediol (neopentyl glycol), the 1,2-, 1,3- and 1,4-cyclohexanediols and the corresponding cyclohexane dimethanols, diethylene glycol, dipropylene glycol, and diols such as alkoxylated bisphenol A products, e.g. ethoxylated or propoxylated bisphenol A. Suitable polyols having three hydroxy groups per molecule include triols such as trimethylolpropane (1,1,1-tris (hydroxymethyl)ethane). Suitable polyols having four or more hydroxy groups per molecule include pentaerythritol (2,2-bis(hydroxymethyl)-1,3-propanediol) and sorbitol (1,2, 3,4,5,6-hexahydroxyhexane).

Compounds having two or more groups which readily undergo an ester condensation reaction and have one or more sulphonate groups are dicarboxylic acid monomers having at least one ionised sulphonate group. Examples of such compounds are aromatic dicarboxylic acids having an ionised sulphonate group, for example those of the formula:

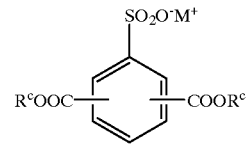

wherein M is a cation (preferably sodium, lithium or potassium); and each $R^c$ independently is H, a cation or $C_{1-4}$-alkyl (preferably methyl or ethyl). Preferred compounds of the above formula are of formula:

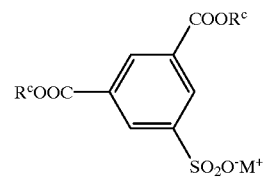

wherein M and $R^c$ are as defined above. Particularly preferred is the mono sodium salt (one $R^c$ is H, the other is Na), this material being known as sodio-5-sulphoisophthalic acid (SSIPA).

Other useful compounds which have two or more groups which readily undergo an ester condensation reaction and have one or more sulphonate groups are dihydroxy monomers having at least one sulphonate group, especially those of the formula:

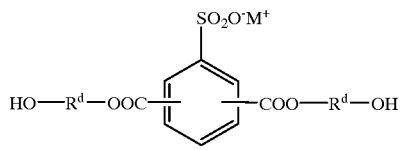

wherein M is as hereinbefore defined above and each $R^d$ independently is alkylene, preferably $C_{2-4}$-alkylene. Preferred compounds of the above formula are:

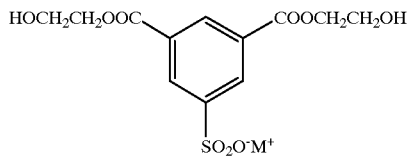

wherein M is as hereinbefore defined.

Polyesters bearing ionised carboxy groups can be prepared by various means. For example, if the hydroxyl component of the reactants is stoichiometrically in excess of the acid component, a hydroxyl-terminated polyester can be formed, which may be subsequently converted to a carboxy terminated polyester by wholly or partially reacting the hydroxyl groups with an appropriate reagent (e.g an acid anhydride or a dicarboxylic acid). Alternatively, terminal carboxy functionality may be directly introduced by employing an appropriate stoichiometric excess of the acid component reactants. In another alternative, chain-pendant carboxy groups may be introduced by using reagents such as dimethylol propionic acid (DMPA) since if appropriate reaction condition are employed (e.g. polymerisation temperature below 150° C.) the hindered carboxy group thereof does not take part to any significant extent in the ester-forming reactions during the polyester synthesis and the DMPA effectively behaves as a simple diol. Chain-pendant and/or terminal carboxy groups could also be introduced by employing a tri- or higher functionality carboxylic acid or anhydride in the polyester synthesis, for example, trimellitic acid or anhydride. Combinations of the above procedures could also be used. It is thus seen that terminal or side-chain carboxy groups or both can be introduced as desired. These can be fully or partially neutralised with an appropriate base to yield ionised carboxy groups. The counter ions used may be as for the ionised sulphonate groups described above (apart from H+since the carboxylic acid groups themselves are normally insufficiently ionised to provide a significant amount of ionised carboxy groups—although F substituents would increase acid strength), with alkali metal ions such as Na+, Li+ and K+ again being particularly preferred, and ammonium and organic amine derived cations less preferred because some have an undesirable odour.

The water-dissipatable polyester may optionally have hydrophilic non-ionic segments, for example within the polyester backbone (i.e. in-chain incorporation) or as chain-pendant or terminal groups. Such groups may act to contribute to the dispersion stability or even water-solubility of the polyester. For example, polyethylene oxide chains may be introduced into the polyester during its synthesis by using as part of the hydroxyl component, ethylene oxide-containing mono, di or higher functional hydroxy compounds, especially polyethlene glycols and alkyl ethers of polyethylene glycols, examples of which include:

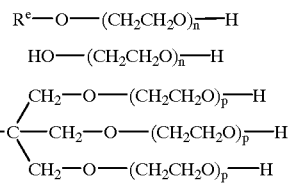

wherein $R^e$ is $C_{1-20}$-alkyl, preferably $C_{1-4}$-alkyl, more preferably methyl; n is 1 to 500; and p is 1 to 100.

A small segment of a polyethylene oxide chain could be replaced by a propylene oxide or butylene oxide chain in such non-ionic groups, but should still contain ethylene oxide as a major part of the chain.

The amount of ionised sulphonate and/or carboxy groups present in the polyester should be sufficient to provide or contribute to water-dissipatability of the polyester, although it should not be so high as to render the resulting polyester unacceptably water-sensitive. This amount will depend, inter alia, on factors such as the hydrophilicity/hydrophobicity of units provided by other monomers in the polyester synthesis or any surfactants (if used), and also the relative proportions of ionised sulphonate/carboxy groups. With regard to the last mentioned point, ionised sulphonate groups are more effective at providing or contributing to water-dissipatability than ionised carboxy groups and so can be used at considerably lower levels in comparison to ionised carboxy groups.

If the polyester is wholly or predominantly sulphonate stabilised (by which is meant the water dissipatability-providing groups are provided wholly or predominately by ionised sulphonate groups). The ionised sulphonate group content is preferably within the range from 7.5 to 100 milliequivalents (more preferably 10 to 75 milliequivalents and particularly 11 to 56 milliequivalents) per 100 g of polyester. When using SSIPA as the monomer for providing the ionised sulphonate groups, the amount of this monomer used in the polyester synthesis, based on the weight of all the monomers used in the polyester synthesis, will usually be within the range from 2 to 20% by weight (more usually 3 to 15% by weight). The carboxylic acid value (AV) of the polyester which is predominantly sulphonate stabilised, i.e. an AV based on the carboxylic acid groups only (i.e. excluding sulphonate groups) will generally be within the range of from 0 to 100 mgKOH/g, more preferably 0 to 50 mgKOH/g, especially 0 to 25 mgKOH/g, more especially 0 to 10 mgKOH/g.

If the polyester is predominantly stabilised by ionised carboxy groups, the carboxylic acid value AV of the polyester is preferably within the range of from 20 to 140 mgKOH/g (more preferably 30 to 100 mgKOH/g).

Usually, the polyester is either predominantly sulphonate-stabilised or predominantly carboxylate stabilised (preferably the former).

If the polyester contains polyethylene oxide chains, the polyethylene oxide chain content should preferably not exceed 25% by weight (and more preferably should not exceed 15% by weight), based on the total weight of the polyester, in order to avoid unacceptable water-sensitivity. Therefore the amount is preferably 0 to 25% by weight (more preferably 0 to 15% by weight) based on the total weight of polyester.

The water-dissipatable polyester preferably has a number average molecular weight Mn of up to 30,000. The Mn is preferably in the range from 500 to 30,000, more preferably 1000 to 25,000, especially 2000 to 20,000. These Mn lead to particularly good storage stability for the resultant inks. The measurement of Mn is well known to those skilled in the art, and may for example be effected using gel permeation chromatography in conjunction with a standard polymer such as polystyrene or polymethylmethacrylate of known molecular weight.

The water-dissipatable polyester preferably has a hydroxyl number of from 0 to 225 mg KOH/g, more preferably 0 to 125 mg KOH/g, especially from 0 to 50 mgKOH/g.

The ink preferably has a pH of 5 to 9, more preferably 5.5 to 8, especially 6 to 7.5. These preferences are based on increased ink stability.

The Tg of the water-dissipatable polyester (i.e. the temperature at which the polymer changes from a glassy, brittle state to a plastic, rubbery state) is preferably in the range $-38°$ C. to $105°$ C., more preferably $-20$ to $70°$ C., especially $-10°$ to $60°$ C.

The esterification polymerisation processes for making the polyesters for use in invention composition are known and need not be described here in more detail. Suffice to say that they are normally carried out in the melt using catalysts, for example a tin-based catalyst, and with the provision for removing any water or alcohol formed from the condensation reaction.

The water-dissipatable polyester may be dissipated in water by adding the solidified melt directly into water. The solidified melt is preferably in a form such as flake (which can often be obtained directly from the melt) or comminuted solid (obtained for example by grinding). Alternatively, water can be added directly to the hot polyester melt until the desired solids content/viscosity is reached. Still further, the polyester may be dissipated in water by adding an aqueous pre-dissipation (or organic solvent solution) of the polyester to the water phase.

The water-dissipatable polyesters normally do not need an external surfactant when being dissipated into water, although such surfactants may be used to assist the dissipation if desired and in some cases can be useful in this respect because additional surfactants reduce the required amount of dissipating groups (i.e. suiphonate, and (mono alkoxy) polyalkylene chains if used).

Water-dissipatable polyesters can also be purchased from Eastman Kodak Company. Examples include Eastman AQ29D and AQ55W.

The water-dissipatable polymer may also be formed by performing free radical polymerisation of olefinically unsaturated monomers in the presence of a polyester. This gives what could be called a polyester-acrylic hybrid. Olefinically unsaturated monomers which can be used include olefinically unsaturated carboxy functional monomers, e.g. acrylic acid, methacrylic acid, fumaric acid, itaconic acid and β-carboxyethyl acrylate; olefinically unsaturated monomers which are free from carboxy and hydroxy groups, e.g. 1,3-butadiene, isoprene, styrene, vinylidene halides, vinylidene esters and esters of acrylic acid and methacrylic acid, e.g. methyl (meth) acrylate, ethyl (meth)acrylate n-butyl (meth)acrylate and 2-ethyl hexyl (meth)acrylate; and olefinically unsaturated monomers having a hydroxy group e.g. N-methylol (meth)acrylamide and hydroxy $C_{2-8}$-alkyl esters of (meth)acrylic acid. If the polyester has been prepared using a component which has unsaturation therein, e.g. fumaric acid, maleic acid or muconic acid or allyl-containing dihydroxy or dicarboxy compounds, the product from the polyesterification reaction will have unsaturation incorporated into its structure which can take part in the free radical polymerisation to give a graft copolymer. The free radical polymerisation processes use a free-radical generating initiator system such as (for example) the redox radical initiator system tertiary butylhydroxide/isoascorbic acid and will take place in the aqueous phase, rather than in the melt. However, excessive amounts of acrylic polymer (whether formed in the presence of polyester which has unsaturation or is free from unsaturation) often leads to a deterioration in ink properties and it is preferred that no acrylic polymer is present or, if its is present, the amount is less than 40%, preferably less than 30%, more preferably less than 10% by weight relative to the weight of polyester.

The dyed water-dissipatable polymer may be prepared by heating a water-dissipatable polymer and a dye carrying a group of Formula (1) at an elevated temperature, for example at a temperature in the range 35 to $150°$ C. preferably from 40 to $90°$ C. Simply mixing the dye and polymer in water at room temperature leads to a slight up-take of colour but heating is usually necessary for a full dyeing.

Preferably inks according to the invention are prepared by mixing together (i) a solution of a dye carrying a group of Formula (1) in a water-immiscible solvent and (ii) a mixture of a water-dissipatable polymer, water-miscible solvent and optionally water. Equally the inks may be prepared by mixing together (i) a solution of a dye carrying a group of Formula (1) in a mixture of a water-miscible solvent and a water-immiscible solvent and (ii) a water-dissipatable polymer and optionally water. In either case, if there is no water in component (ii) the water may be added to the mixture of (i) a (ii) subsequently to give an ink according to the invention. However it is preferred for component (ii) to contain water. These processes lead to particularly good up-take of dye by the polymer to give intensely coloured inks.

The dye is preferably a water-insoluble dye carrying a group of Formula (1) which is soluble in the water-dissipatable polymer. Therefore the dye is preferably free from carboxy and sulpho groups, for example it is preferably a disperse or solvent-soluble dye carrying a group or Formula (1). Disperse and solvent soluble dyes are distinct from pigments in that pigments are insoluble in organic solvents and polyesters whereas disperse and solvent soluble dyes are soluble in organic solvents and polyesters. Useful classes of disperse and solvent soluble dyes include water-insoluble anthraquinones, phthalocyanines, pyrrolines, triphenodioxazines, methines, benzodifuranones, coumarins, indoanilines, benzenoids and azoics, each of which carries a group of Formula (1). Examples of preferred azoics are monoazo, disazo and trisazo disperse and solvent soluble dyes; preferred azoics contain heterocyclic groups. The Colour Index International lists suitable disperse and solvent soluble dyes which can be modified to include a group of Formula (1).

Further examples of disperse dyes are given in the Colour Index; 3rd Edition, Volume 2, pages 2483 to 2741 and further examples of solvent soluble dyes are given in Volume 3, pages 3566 to 3647. Each of these dyes may be modified to incorporate a group of Formula (1).

The amount of dye and water-dissipatable polymer contained in the ink will vary according to the depth of shade required. Typically, however, the ink will comprise (a) from 0.5 to 10 parts, more preferably 1 to 5 parts of a dye carrying a group of Formula (1);

(b) from 2 to 25 parts, more preferably 5 to 15 parts of a water-dissipatable polymer;

(c) from 40 to 90 parts, more preferably from 50 to 80 parts of water; and (d) from 0 to 60 parts, more preferably 0 to 40 parts of organic solvent; wherein all parts are by weight and the total number of parts of (a)+(b)+(c)+(d) add up to 100.

The number of parts of the water-dissipatable polymer is calculated on a 100% solids basis. For example 50 g of a 20% solids polymer is taken as 10 g of polymer.

The ink may also contain an organic solvent (as mentioned in (d) above) and this may be a mixture of organic solvents. In a preferred embodiment the ink contains an organic solvent consisting of a water-miscible organic solvent and a water-immiscible organic solvent.

Suitable water-immiscible organic solvents include aromatic hydrocarbons, e.g. toluene, xylene, naphthalene, tetrahydronaphthalene and methyl naphthalene; chlorinated aromatic hydrocarbons, e.g. chlorobenzene, fluorobenzene, chloronaphthalene and bromonaphthalene; esters, e.g. butyl acetate, ethyl acetate, methyl benzoate, ethyl benzoate, benzyl benzoate, butyl benzoate, phenylethyl acetate, butyl lactate, benzyl lactate, diethyleneglycol dipropionate, dimethyl phthalate, diethyl phthalate, dibutyl phthalate, di(2-ethylhexyl) phthalate; alcohols having six or more carbon atoms, e.g. hexanol, octanol, benzyl alcohol, phenyl ethanol, phenoxy ethanol, phenoxy propanol and phenoxy butanol; ethers having at least 5 carbon atoms, preferably $C_{5-14}$ ethers, e.g. anisole and phenetole; nitrocellulose, cellulose ether, cellulose acetate; low odour petroleum distillates; turpentine; white spirits; naphtha; isopropylbiphenyl; terpene; vegetable oil; mineral oil; essential oil; and natural oil; and mixtures of any two or more thereof. Benzyl alcohol is especially preferred.

Suitable water-miscible organic solvents include $C_{1-5}$-alkanols, e.g. methanol, ethanol, n-propanol, isopropanol, n-butanol, sec-butanol, tert-butanol and isobutanol; amides, e.g. dimethylformamide and dimethylacetamide; ketones and ketone alcohols, e.g. acetone and diacetone alcohol; $C_{2-4}$ether, e.g. tetrahydrofuran and dioxane; alkylene glycols or thioglycols containing a $C_2$–$C_6$ alkylene group, e.g. ethylene glycol, propylene glycol, butylene glycol, pentylene glycol and hexylene glycol; poly(alkylene-glycol)s and thioglycol)s, e.g. diethylene glycol, thiodiglycol, polyethylene glycol and polypropylene glycol; polyols, e.g. glycerol and 1,2,6-hexanetriol; and lower alkyl glycol and polyglycol ethers, e.g. 2-methoxyethanol, 2-(2-methoxyethoxy)ethanol, 2-(2-ethoxyethoxy) ethanol, 2-(2-butoxyethoxy)ethanol, 3-butoxypropan-1-ol, 2-[2-(2-methoxyethoxy)-ethoxy]ethanol, 2-[2-(2-ethoxyethoxy)ethoxy]-ethanol; cyclic esters and cyclic amides, e.g. optionally substituted pyrollidones; sulpholane; and mixtures containing two or more of the aforementioned water-miscible organic solvents. Preferred water-miscible organic solvents are $C_{1-6}$-alkyl mono ethers of $C_{2-6}$-alkylene glycols and $C_{1-6}$-alkyl mono ethers of poly($C_{2-6}$-alkylene glycols).

Component (d) of the above mentioned inks preferably comprises;

(i) 5 to 50% of a water-immiscible alcohol having at least six carbon atoms, (especially benzyl alcohol); and (ii) 50 to 95% of a water-miscible solvent comprising
(a) a cyclic ester or cyclic amide (especially an optionally substituted pyrrolidone);
(b) a water-miscible $C_{1-6}$-alkyl mono ether of a $C_{2-6}$-alkylene glycol or $C_{1-6}$-alkyl mono ether of poly($C_{2-6}$-alkylene glycol); or
(c) a mixture of (a) and (b). wherein all % are by weight and add up to 100%.

The water-immiscible solvent preferably has a solubility in water at 20° C. of up to 50g/l. The water-miscible solvent preferably has a solubility in water at 20° C. of more than 50g/l.

The preferred optionally substituted pyrrolidones, are 2-pyrrolidone, dimethyl pyrrolidone, N-methyl-2-pyrrolidone, N-ethyl-2-pyrrolidone and N-(2-hydroxyethyl)-2-pyrrolidone and mixtures thereof.

The ratio of water-miscible organic solvent to water-immiscible organic solvent is preferably 19:1 to 1:1, more preferably 8:1 to 1:1, especially 5:1 to 1:1.

Use of dyes carrying a group of Formula (1) has advantages over the use of pigments in that less dye is usually required than would be the case for a pigment, expensive milling is avoided, the inks are less likely to form a precipitate on standing, a far greater variety of shades are available and the resultant prints have good transparency. The latter quality is particularly important for the production of coloured substrates which require transparency, for example over-head projector slides and colour filters used in LCD television screens. The inks of the present invention also benefit from good light- and water-fastness.

A valuable feature of the invention is the low tendency for blocking the nozzles of thermal ink jet printers. Many other water dispersible polymer inks work poorly or even not at all in thermal printers. Inks of the invention form discrete droplets on the substrate with little tendency for diffusing. Consequently sharp images can be obtained, resulting in excellent print quality and little if any bleed between colours printed side-by side.

A further feature of the invention provides a composition comprising a water-dissipatable polymer and a dye which carries a group of Formula (1) as hereinbefore defined. In these compositions the preferred water-dissipatable polymers and dyes are as hereinbefore described. Such compositions may be dissipated in water and optionally mixed with further ingredients to give in ink, for example with one or more organic solvents.

The composition preferably comprises (a) 0.125 to 40 parts of dye which carries a group of Formula (1) as hereinbefore defined; and (b) 99.875 to 60 parts of a water-dissipatable polymer, wherein the total number of parts of (a) and (b) adds up to 100.

According to a further feature the present invention provides a process for printing an image on a substrate comprising applying thereto an ink comprising water, a water-dissipatable polymer and a dye carrying a group of Formula (1) as hereinbefore defined, by means of an ink jet printer.

The ink jet printer emits droplets of the ink onto a substrate from a nozzle without bringing the nozzle into contact with the substrate. Preferably the ink jet printer is a thermal or piezoelectric ink jet printer.

The substrate is preferably a paper, an overhead projector slide or a textile material. Preferred textile materials are cotton, polyester and blends thereof.

When the substrate is a textile material the process for printing an image thereon according to the invention preferably further comprises the step of heating the resultant printed textile, preferably to a temperature of 50° C. to 250° C.

The inks of the present invention may also be used for the preparation of colour filters, for example those used in flat bed displays.

The invention is further illustrated by the following examples in which all parts and percentages are by weight unless specified otherwise. In these Examples the following abbreviations are used:

Paper XA is Xerox 4024 from Rank Xerox.

Paper GB is Gilbert Bond paper from the Mead Corporation.

Paper WC is Wiggins Conqueror High White Wove 100 g/m² from Arjo Wiggins Ltd.

means not measured.

Water-Dissipatable Polymer ("Resin 1")

To a glass reactor fitted with distillation column and condenser were charged ingredients A, B, D, F, G and 50% of C and 50% of H. The contents were heated with stirring to a reaction temperature of 210° C. until the mixture was clear and the acid value was <10 mgKOH/g. At this point E and the remainder of C and H were charged and the temperature raised to 230° C. The reaction was continued under reduced pressure until an acid value of 5.3 mgKOH/g was obtained. The resin was further characterised by a hydroxyl value=27.6 mgKOHg, ICI Cone and Plate viscosity @ 125° C.=80 poises and a Tg (onset)=25.4° C. and a number average molecular weight by end group analysis of approximately 2000. The resin was readily dispersed in warm distilled water to give a clear solution having a solids content of 20% w/w (hereinafter "Resin 1").

| Monomer | Abbreviation | Weight (g) |
| --- | --- | --- |
| neopentyl glycol | A | 206.25 |
| diethylene glycol | B | 82.5 |
| isophthalic acid | C | 300 |
| sodio-5-sulpho-isophthalic acid | D | 75 |
| adipic acid | E | 37.5 |
| methoxy PEG 750 | F | 75 |
| sodium acetate | G | 1.5 |
| Fascat 4101 | H | 0.75 |

Water-dissipatable Polymer ("Resin 2")

To a glass reactor fitted with distillation column and condenser were charged ingredients A, B, C, E, G, H and 50% of D and 50% of I. The contents were heated with stirring to a reaction temperature of 210° C. until the mixture was clear and the acid value was 1.25 mgKOH/g. At this point F and the remainder of D and I were charged and the temperature raised to 230° C. The reaction was continued under reduced pressure until an acid value of 2.8 mgKOH/g was obtained. The resin was further characterised by a hydroxyl value=19.7 mgKOH/g, ICI Cone and Plate viscosity @ 125° C.=90 poises and a Tg (onset)=4° C. The resin was readily dispersed in warm distilled water to give a clear solution having a solids content of 20% w/w. (hereinafter "Resin 2").

| Monomer | Abbreviation | Weight (g) |
| --- | --- | --- |
| neopentyl glycol | A | 653.47 |
| diethylene glycol | B | 479.21 |
| 1,6 hexane diol | C | 396.04 |
| isophthalic acid | D | 1584.16 |
| sodio-5-sulpho-isophthalic acid | E | 396.04 |
| adipic acid | F | 198.02 |
| methoxy PEG 750 | G | 396.04 |
| sodium acetate | H | 8 |
| Fascat 4101 | I | 4 |

Water-Dissipatable Polymer ("Resin 3")

To a glass reactor fitted with distillation column and condenser were charged ingredients A, B, D, E, F, G and 50% of C and 50% of H. The contents were heated with stirring to a reaction temperature of 210° C. until the mixture was clear and the acid value was <10 mgKOH/g. At this point the remainder of C and H were charged and the temperature raised to 230° C. The reaction was continued under reduced pressure until an acid value of 9.4 mgKOH/g was obtained. The resin was further characterised by a 15 hydroxyl value=3.4 mgKOHg, ICI Cone and Plate Viscosity @ 125° C.=>500 poises and a Tg (onset)=18° C. The number average molecular weight by end group analysis was 8766. The resin was readily dispersed in warm distilled water to give a clear solution having a solids content of 20% w/w (hereinafter "Resin 3").

| Monomer | Abbreviation | Weight (g) |
| --- | --- | --- |
| neopentyl glycol | A | 15 |
| diethylene glycol | B | 10 |
| isophthalic acid | C | 45 |
| sodio-5-sulpho-isophthalic acid | D | 10 |
| Hexane-1,6-diol | E | 10 |
| Methoxy PEG 750 | F | 10 |
| Sodium acetate | G | 0.2 |
| Fascat 4101 | H | 0.1 |

EXAMPLE 1

A dye of the formula shown below was prepared by using stages 1a to 1c described below:

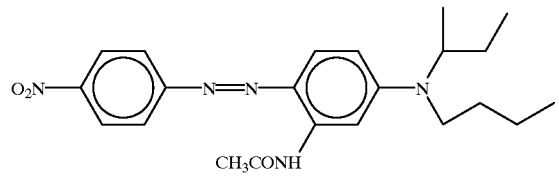

Dye 1

Stage 1a—3-(N-sec-butylamino)acetanilide

3-Aminoacetanilide (186.2 g), 2-bromobutane (198 g), triethylamine (150 g) and ethanol (1 litre) were heated under reflux for 64 hrs. After cooling to room temperature the reaction mixture was filtered to remove triethylamine hydrochloride and the solvent evaporated under reduced pressure to leave a dark oil which was purified by chromatrography on silica gel. The product was crystallised by trituration under hexane.

Stage 1b—3-(N-n-butyl-N-sec-butylamino) acetanilide

The product from Stage 1a (20.6 g), 1-bromobutane (63.7 g) and anhydrous potassium carbonate (13.89) were stirred and heated under reflux for 36 hours. The cooled reaction mixture was diluted with methanol (50 ml) and filtered to remove the inorganic salts. Evaporation of the excess bromobutane and methanol under reduced pressure gave a viscous oil which was purified by chromatography on silica gel.

Stage 1c—Dye 1

4-Nitrobenzenediazonium fluoroborate (1.18 g) was dissolved in a mixture of water (50 ml) and hydrochloric acid (2.5 ml) and added to an ice cold solution of the product from stage 1b (1.31 g) in dilute hydrochloric acid (50 ml). Sodium acetate was added to raise the pH to 4 to 4.5 and the resulting dye recovered by filtration, washed with alcohol and dried.

Dye 1 was obtained as an orange solid (1.5 g).

Stage 2—Ink Preparation

An ink was prepared by dissolving Dye 1 in benzyl alcohol and adding the water-dissipatable polyester (in water and 2-pyrrolidone) to the dye solution.

The final ink had the formulation:

| Component | Weight (g) |
|---|---|
| Dye 1 | 0.25 |
| Resin 1 | 50 g (20% solids) |
| Benzyl alcohol | 10 |
| 2-pyrrolidone | 20 |
| Water | 19.75 |
|  | 100 |

EXAMPLE 2

Stage 1

A dye having the formula shown below was prepared by the method described in stages 1a to 1d below:

Dye 2

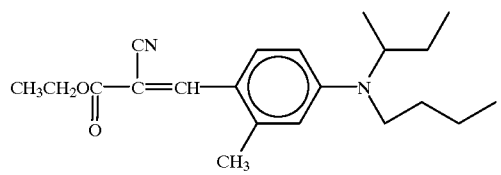

Stage 1a
N-sec-butyl-3-toluidine

3-Toluidine (107.16 g), 2-butanone (72.11 g) and propionic acid (74.08 g) were stirred and cooled to 0° C. Sodium borohydride (37.83 g) was then added in portions keeping the temperature below 5° C. After allowing to warm to room temperature the reaction mixture was carefully poured onto ice/water. The product was extracted into ethyl acetate, washed with water, 2% hydrochloric acid and finally water again before drying over magnesium sulphate. Evaporation of the solvent under reduced pressure gave a brown oil which was purified by chromatography on silica gel.

Stage 1b—N-n-Butyl-N-sec-butyl-3-toluidine

The method of Example 1, stage 1b, was repeated except that in place of the product from Example 1, stage 1a, there was used the product from Example 2, stage 1a.

Stage 1c

N-n-Butyl-N-sec-butyl-3-toluidine (10.95 g) was dissolved in dimethyl formamide (150 ml) and cooled to 0–5° C. Phosphorus oxychloride (15.3 g) was then added dropwise keeping the temperature below 5° C. After allowing to warm to room temperature the reaction mixture was heated to 80° C. for 2½ hours, cooled and powered onto ice. The product was extracted into toluene, dried over magnesium sulphate and isolated by evaporation of the solvent under reduced pressure and purified by chromatography on silica gel.

Stage 1d—Dye 2

4-(N-n-butyl-N-sec-butylamino)-2-methylbenzaldehyde (29) and ethylcyanoacetate (1 ml) were dissolved in ethanol (5 ml). Piperidine (3 drops) was added and the mixture stirred at room temperature from 30 minutes. Evaporation of the solvent gave an orange oil which crystallised on trituration under hexane.

Dye 2 was obtained as a yellow solid (2.6 g).

Stage 2—Ink Preparation

An ink formulation of the composition:

| Component | Weight (g) |
|---|---|
| Dye 2 | 1 |
| Resin 2 | 50 (20% solids) |
| benzyl alcohol | 10 |
| 2-pyrrolidone | 20 |
| Water | 19 |
|  | 100 | was prepared by the method described in stage 2 of Example 1.

COMPARATIVE EXAMPLE 1

An ink was prepared as described in Example 1 except that in place of Dye 1 there was used Dye 3 shown below:

Dye 3

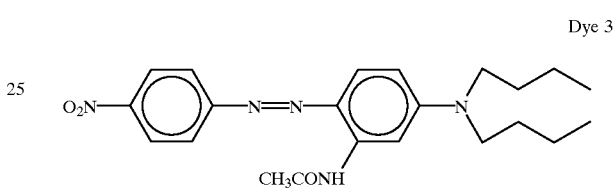

COMPARATIVE EXAMPLE 2

An inks was prepared as described in Example 2 except that in place of Dye 2 there was used Dye 4 shown below:

Dye 4

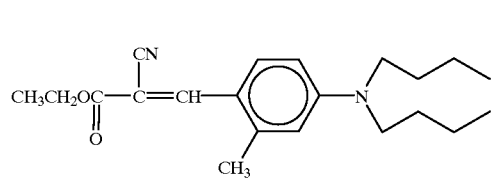

EXAMPLE 3

IJP Using the Ink

The inks descried in Examples 1 and 2 and in the comparative Examples were printed onto three commercially available papers, as described in Table 1 below, using a Hewlett Packard themal ink jet printer. The prints resulting from inks 1 and 2 had very good Colour strength and brightness (chroma).

The prints were irradiated with light using an Atlas Ci35 Weatherometer and the colour change ($\Delta E$) was measured after the time indicated in Table 1:

TABLE 1

| Ink | Time (hours) | $\Delta E$ on paper XA | $\Delta E$ on paper GB | $\Delta E$ on paper WC |
|---|---|---|---|---|
| Dye 1 | 24 | 12.9 | 12.75 | 11.69 |
|  | 48 | 18.61 | 18.25 | 18.47 |
|  | 72 | 25.03 | 21.47 | 24.43 |
|  | 100 | 25.75 | 26.85 | 29.79 |

TABLE 1-continued

| Ink | Time (hours) | ΔE on paper XA | ΔE on paper GB | ΔE on paper WC |
|---|---|---|---|---|
| Dye 3 | 24 | 19.45 | 19.37 | 17.37 |
| (Comparative) | 48 | 26.51 | 24.91 | 25.53 |
|  | 72 | 31.41 | 29.27 | 32.15 |
|  | 100 | 36.77 | 31.69 | 35.71 |
| Dye 2 | 24 | 14.11 | — | 20.11 |
|  | 48 | 31.55 | — | 40.11 |
|  | 72 | 48.79 | — | 59.99 |
| Dye 4 | 24 | 19.41 | — | 29.13 |
| (Comparative) | 48 | 44.85 | — | 59.33 |
|  | 72 | 59.53 | — | 70.43 |

The lower ΔE for Dye 1 and Dye 2 versus Dye 3 and Dye 4 show lower fading (i.e. higher light fastness).

The lower ΔE for Dye 1 and Dye 2 versus Dye 3 and Dye 4 show lower fading (i.e. hihger light fastnees).

EXAMPLE 6

Stage 1

The method of Example 2, stage 1 was repeated except that in place of ethlcyanoacetate there was used malononitrile. The resultant dye had the structure:

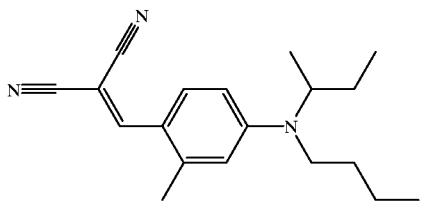

Dye 5

Stage 2—Comparative

Similarly a dye was prepared having the following structure:

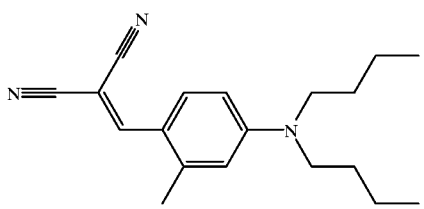

Dye 6

Stage 3—Inks

Inks containing Dye 5 or Dye 6 were prepared having the following formulation:

| Dye | 1 g |
|---|---|
| Benzyl Alcohol | 10 g |
| 2-Pyrrolidone | 20 g |
| Resin 2 | 50 g (20% solids) |
| Morpholine | 1 g |
| Water | 18 g |

Stage 4—Ink Jet Printing

Inks containing Dye 5 and Dye 6 respectively were printed onto Xerox acid paper using an ink jet printer. The prints were irradiated with light using an Atlas Ci35 Weatherometer and the colour change (ΔE) CIE Lab recorded in the table below.

| Dye in Ink | Time (Hours) | ΔE |
|---|---|---|
| Dye 5 | 24 | 3.11 |
| Dye 5 | 48 | 15.61 |
| Dye 5 | 72 | 22.25 |
| Dye 6 (Comparative) | 24 | 4.91 |
| Dye 6 (Comparative) | 48 | 19.11 |
| Dye 6 (Comparative) | 72 | 29.73 |

The lower figures for Dye 5 show that this dye had better light fastness than isomeric Dye 6.

EXAMPLE 7

Preparation of:

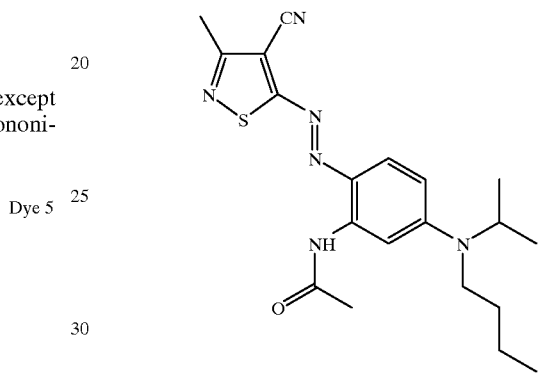

Dye 7

5-Amino-4-cyano-3-methylisothiazole

The title compound was prepared according to the method described in J.Heterocyclic chem. 1975 12 883.

Stage 1b 3-(N-iso-propylamino)acetanilide

The method of Example 2 stage 1a was repeated except that in place of 3-toluidine there was used 3-aminoacetanilide and 2-butanone was replaced by 2-propanone.

Stage 1c 3-(N-n-butyl-N-iso-propylamino)acetanilide

The method of Example 1, stage 1b was repeated but replacing the product from Example 1 stage 1a by the product from Example 7 stage 1b.

Stage 1d

A mixture of acetic acid (30 ml), propionic acid (5 ml), sulphuric acid (2 ml) and nitrosyl sulphuric acid (7ml, 40% w/w soln) was stirred and cooled to −5 to 0° C. and 5-amino-4-cyano-3-methylisothiazole (2.7 g) was added portionwise. After stirring at −5 to ° C. for 3 hours excess nitrosyl sulphuric acid was destroyed by the addition of sulphamic acid. The resulting diazonium salt solution was then added slowly at 0–5° C. to a solution of the product from Example 7, stage 1c (4.97 g), in methanol (100 ml) to which sodium acetate (5.5 g) had been added. After stirring for 1 hour, water (250 ml) was added and the oily product extracted into dichloromethane and dried over magnesium sulphate. The crude product obtained on evaporation of the solvent under reduced pressure was purified by chromatrogaphy on silica gel to give Dye 7.

Stage 2—Comparative

The method of Stage 1d was repeated except that in place of the product from Example 7, Stage 1c, there was used 3-(N,N-di-n-butylamino)acetanilide to give Dye 8.

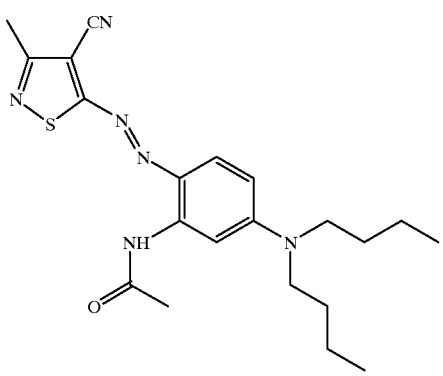

Dye 8

Stage 3—Inks

Inks containing Dye 7 or Dye 8 were prepared having the following formulation:

| Dye | 0.25 g |
|---|---|
| Benzyl Alcohol | 25 g |
| 2-Pyrrolidone | 20 g |
| Resin 1 | 35 g (20% solids) |
| Water | 19.75 g |

Stage 4—Ink Jet Printing

Inks from Stage 3 containing Dye 7 and Dye 8 respectively were printed onto Xerox acid paper using an ink jet printer. The prints were irradiated using an Atlas Ci35 weatherometer and the colour change ($\Delta E$) recorded in the Table below:

| Dye in Ink | Time (hours) | $\Delta E$ |
|---|---|---|
| 7 | 24 | 10.55 |
| 7 | 48 | 13.59 |
| 7 | 72 | 16.23 |
| 7 | 100 | 20.73 |
| 8 (Comparative) | 24 | 12.89 |
| 8 (Comparative) | 48 | 16.63 |
| 8 (Comparative) | 72 | 20.61 |
| 8 (Comparative) | 100 | 24.73 |

EXAMPLE 8

Stage 1

Preparation of:

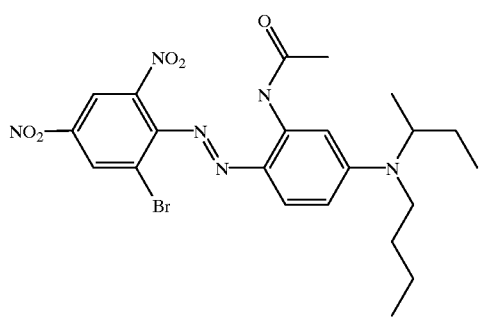

Dye 9

Stage 1

The method of Example 7 Stage 1d was repeated except that in place of 5-amino-4-cyano-3-methylisothiazole there was used 2-bromo-4,6-dinitroaniline (5.24 g) and in place of the product from Example 7 Stage 1c was used Example 1 Stage 1b (5.25 g).

Stage 2—Comparative

Preparation of:

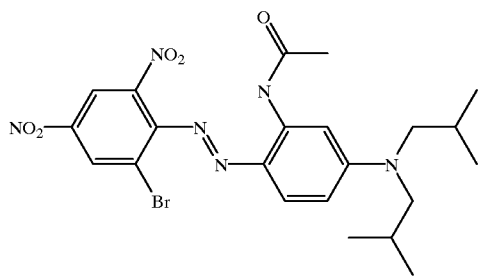

Dye 10

Stage 2a—3-(N,N-bis-(2-methylprop-1-yl)amino)acetanilide

3-Aminoacetanilide (74.4 g), 1-bromo-2-methylpropane (164 g), water (600 ml) and calcium carbonate (118 g) were stirred and heated to reflux for 20 hours. After cooling to room temperature dichloromethane (250 ml) was added and the mixture filtered, washing the filter cake with dichloromethane (2×100 ml). The organic phase was separated, dried over magnesium sulphate and the solvent together with excess 1-bromo-2-methylpropane was evaporated under reduced pressure to give a dark brown viscous oil. This product was used without further purification.

Stage 2b

The method of Example 7 Stage 1d was repeated except that in place of 5-amino-4-cyano-3-methylisothiazole there was used 2-bromo-4,6-dinitroaniline (5.24 g) and in place of the product from Example 7 Stage 1c there was used Example 8 Stage 2a.

Stage 3—Inks

Inks containing Dye 9 or Dye 10 were prepared having the following formulations:

| Dye | 1 g |
|---|---|
| Benzyl Alcohol | 10 g |
| 2-Pyrrolidone | 20 g |
| Resin 1 | 50 g (20% solids) |
| Water | 19 g |

Stage 4—Ink Jet Printing

Inks from Stage 3 containing Dye 9 and Dye 10 respectively were printed onto Xerox acid paper using an ink jet printer. The resultant change in colour ($\Delta E$) after 100 hours irradiation were: Dye 9 $\Delta E=29.83$; Dye 10 (Comparative) $\Delta E=37.27$.

EXAMPLE 9

Stage 1
Preparation of

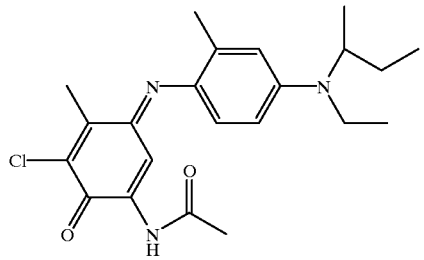

Dye 11

Stage 1a
2-Amino-4,6-dichloro-5-methylphenol

The title compound may be prepared as disclosed in Chemical Abstracts 78:97311

Stage 1b
2-Acetylamino-4,6-dichloro-5-methylphenol

The product from Example 9, Stage 1a (4.8 g), was stirred in acetic acid (20 ml) and acetic anhydride (5 ml) was added in one portion. Stirring was continued for 1hour after the initially exothermic reaction had subsided. The product was isolated by filtration and recrystallised from aqueous ethanol.

Stage 1c
3-(N-sec-butyl-N-ethyl)toluidine

The method of Example 1, Stage 1b, was repeated replacing 1-bromobutane by iodoethane.

Stage 1d
N-sec-butyl-N-ethyl-4-nitroso-3-toluidine

The product from Stage 1c (9.57 g) was dissolved in hydrochloric acid (20 ml) and the solution cooled to 0-5° C. A solution of sodium nitrite (3.45 g) in water (15 ml) was added dropwise at 0–5° C. and the mixture further stirred for 1 hour at room temperature before drowning into water (100 ml). The pH was adjusted to 9 with dilute sodium hydroxide solution and the product extracted into dichloromethane (2×100 ml). The organic phase was separated, dried over magnesium sulphate, filtered and the solvent removed under reduced pressure to give a greenish yellow oil which was used without further purification.

Stage 1e
4-Amino-N-sec-butyl-N-ethyl-3-toluidine

A suspension of iron powder (8.34 g) in methanol (60 ml) and hydrochloric acid (20 ml) was stirred at reflux for 15 mins. A solution of the product from Stage 1d (11 g) in methanol (60 ml) was added dropwise over 15 mins and refluxing continued for 3 hours. Sodium carbonate was added until no soluble iron remained and the solution was alkaline to Brilliant Yellow paper. The hot reaction mixture was filtered and the solvent removed under reduced pressure to give the product as a brown oil.

Stage 1f
Preparation of Dye 11

The product from Stage 1b (2.34 g) was stirred in acetone (50 ml) and a solution of sodium carbonate (3.88 g) in water (20 ml) added followed by the product from Stage 1e (2.06 g). A solution of ammonium persulphate (4.56 g) in water (30 ml) was then added and stirring continued for 2 hours. The product was isolated by filtration, washed with water and dried before purification by column chromatography on silica gel.

Stage 2—Comparative
Preparation of:

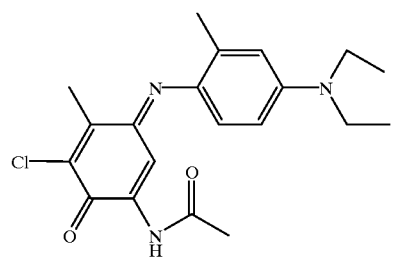

Dye 12

Stage 2a
The method of Example 9, Stage 1d, was repeated replacing the product from Example 9 Stage 1c by N,N-diethyl-3-toluidine.

Stage 2b
The method of Example 9, Stage 1e, was repeated replacing the product from Example 9 Stage 1d by the product from Example 9 Stage 2a.

Stage 2c
The method of Example 9, Stage 1f, was repeated replacing the product from Example 9, Stage 1e, by the product from Example 9 Stage 2b.

Stage 3—Inks
Inks containing Dye 11 or Dye 12 were prepared having the following formulation

| Dye | 1 g |
| Benzyl Alcohol | 10 g |
| 2-Pyrrolidone | 20 g |
| Resin 3 | 45 g (20% solids) |
| Water | 24 g |

Stage 4—Ink Jet Printing
Inks from stage 3 containing Dye 11 and Dye 12 respectively were printed onto Xerox Acid Paper and Wiggins Conqueror paper. The prints were irradiated and the colour change (ΔE) were as follow:

| Dye in ink | Paper | Δ (100 hours) |
|---|---|---|
| 11 | XA | 21.41 |
| 12 (Comparative) | XA | 26.09 |
| 11 | WC | 17.27 |
| 12 (Comparative) | WC | 32.01 |

What is claimed is:
1. An ink comprising water, a water-dissipatable polymer and a dye, wherein the dye carries a group of the Formula (1):

(1)

wherein:
R$^1$ is optionally substituted branched chain alkyl; and
R$^2$ is H, optionally substituted alkyl or optionally substituted aryl.

2. An ink according to claim 1 wherein $R^1$ is α-branched optionally substituted alkyl.

3. An ink according to claim 1 wherein $R^1$ is a group of the formula —$CHR^3R^4$ wherein $R^3$ and $R^4$ are each independently optionally substituted alkyl or $R^3$ and $R^4$ together with the CH group to which they are attached form an optionally substituted 5- or 6-membered ring.

4. An ink according to claim 1, 2 or 3 wherein $R^1$ has from 3 to 20 carbon atoms.

5. An ink according to claim 1, 2 or 3 wherein $R^1$ is prop-2-yl, but-2-yl, pent-2-yl, pent-3-yl, hex-2-yl, hex-3-yl, hept-2-yl, cyclopentyl or cyclohexyl.

6. An ink according to claim 1, 2 or 3 wherein the dye is of the formula:

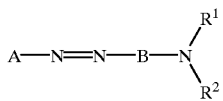

wherein:
A is the residue of a diazotisable aromatic or heterocyclic amine;
B is an optionally substituted 1,4-phenylene group; and
$R^1$ and $R^2$ are as hereinbefore defined.

7. An ink according to claim 1, 2 or 3 wherein the dye is of the formula:

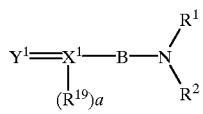

wherein:
$X^1$ is N or C;
a is 0 when $X^1$ is N;
a is 1 when $X^1$ is C;
$R^{19}$ is —H, —CN or —COOalkyl;
B is an optionally substituted 1,4-phenylene group;
$R^1$ and $R^2$ are as hereinbefore defined; and
$Y^1$ is a homocyclic ring, a heterocyclic ring, a carbon atom carrying an electron withdrawing group or $Y^1$ together with $X^1$ and $(R^{19})$a forms a homocyclic or heterocyclic ring.

8. An ink according to claim 1, 2 or 3 wherein the water-dissipatable polymer is a water-dissipatable polyester.

9. An ink according to claim 8 wherein the water-dissipatable polyester bears ionised sulphonate and/or carboxy groups.

10. An ink according to claim 8 wherein the water-dissipatable polyester has an Mn of below 30,000.

11. An ink according to claim 1, 2 or 3 comprising:
(a) from 0.5 to 10 parts of the dye carrying a group of Formula (1);
(b) from 2 to 25 parts of the water-dissipatable polymer;
(c) from 40 to 90 parts of water; and
(d) from 0 to 60 parts of an organic solvent;
wherein all parts are by weight and the total number of parts of (a)+(b)+(c)+(d) add up to 100.

12. A composition comprising a water-dissipatable polymer and a dye which carries a group of Formula (1), as defined in claim 1.

13. A composition according to claim 12 wherein the water-dissipatable polymer is a water-dissipatable polyester.

14. An ink according to claim 1, 2 or 3 which contains a water-miscible organic solvent and a water-immiscible organic solvent.

15. A process for printing an image on a substrate comprising applying thereto an ink according to claim 1, 2 or 3 by means of an ink jet printer.

16. An ink according to claim 6, comprising:
(a) from 0.5 to 10 parts of the dye carrying group of Formula (1);
(b) from 2 to 25 parts of the water-dissipatable polymer;
(c) from 40 to 90 parts water; and
(d) from 0 to 60 parts of an organic solvent; wherein all pars are by weight and the total number of parts (a)+(b)+(c)+(d) add up to 100.

17. An ink according to claim 7, comprising:
(a) from 0.5 to 10 parts of the dye carrying group of Formula (1);
(b) from 2 to 25 parts of the water-dissipatable polymer;
(c) from 40 to 90 parts water; and
(d) from 0 to 60 parts of an organic solvent;
wherein all pars are by weight and the total number of parts (a)+(b)+(c)+(d) add up to 100.

18. A process for printing an image on a substrate comprising applying thereto an ink according to claim 6 by means of an ink printer.

19. A process for printing an image on a substrate comprising applying thereto an ink according to claim 7 by means of an ink printer.

* * * * *